(12) United States Patent
Kim et al.

(10) Patent No.: US 10,107,688 B2
(45) Date of Patent: Oct. 23, 2018

(54) APPARATUS FOR MEASURING TEMPERATURE OF GLASS MELTING FURNACE

(71) Applicant: KOREA HYDRO & NUCLEAR POWER CO., LTD., Gyeongsangbuk-do (KR)

(72) Inventors: Deuk Man Kim, Daejeon (KR); Young Il Kim, Daejeon (KR); Cheon Woo Kim, Daejeon (KR)

(73) Assignee: KOREA HYDRO & NUCLEAR POWER CO., LTD., Gyeongju-si, Gyeongsangbuk-do (KR)

( * ) Notice: Subject to any disclaimer, the term of this patent is extended or adjusted under 35 U.S.C. 154(b) by 265 days.

(21) Appl. No.: 14/765,645

(22) PCT Filed: May 16, 2013

(86) PCT No.: PCT/KR2013/004368
§ 371 (c)(1),
(2) Date: Aug. 4, 2015

(87) PCT Pub. No.: WO2014/119821
PCT Pub. Date: Aug. 7, 2014

(65) Prior Publication Data
US 2016/0003680 A1    Jan. 7, 2016

(30) Foreign Application Priority Data

Feb. 4, 2013  (KR) .................. 10-2013-0012151

(51) Int. Cl.
*G01J 5/00* (2006.01)
*H04N 5/225* (2006.01)
(Continued)

(52) U.S. Cl.
CPC ............. *G01J 5/0044* (2013.01); *G01J 5/029* (2013.01); *G01J 5/04* (2013.01); *G01J 5/048* (2013.01);
(Continued)

(58) Field of Classification Search
CPC .. G01J 5/0044; G01J 5/029; G01J 5/04; G01J 5/048; G01J 5/061; G01J 5/0803;
(Continued)

(56) References Cited

U.S. PATENT DOCUMENTS 1,717,637 A * 6/1929 Vastine ................ F23M 11/042
126/200
2,261,211 A * 11/1941 Beers ...................... F23M 7/00
126/200
(Continued)

FOREIGN PATENT DOCUMENTS

JP        05-48936 A     2/1993
JP        07-229796 A    8/1995
(Continued)

OTHER PUBLICATIONS

Japanese Office Action dated Mar. 29, 2016.

*Primary Examiner* — Gims S Philippe
*Assistant Examiner* — Stefan Gadomski
(74) *Attorney, Agent, or Firm* — Rabin & Berdo, P.C.

(57) ABSTRACT

An apparatus for measuring the temperature of a glass melting furnace includes a glass window part which has a transparent glass window and is mounted to a temperature measurement hole of the glass melting furnace and extended outward from the glass melting furnace, and a camera part which has a thermographic camera to capture image of an inside of the glass melting furnace through the glass window part. The measuring apparatus supplies cooling gas into the through hole in upper and lower directions, thereby prevent-
(Continued)

ing the surface of the glass window from being covered with fumes, and confines heated gases and fumes to the glass melting furnace.

14 Claims, 9 Drawing Sheets

(51) Int. Cl.
  *G01J 5/08* (2006.01)
  *G01J 5/04* (2006.01)
  *G01J 5/02* (2006.01)
  *G01J 5/06* (2006.01)

(52) U.S. Cl.
  CPC ............ *G01J 5/061* (2013.01); *G01J 5/0803* (2013.01); *G01J 5/0875* (2013.01); *H04N 5/2252* (2013.01); *G01J 2005/0077* (2013.01); *G01J 2005/0081* (2013.01)

(58) Field of Classification Search
  CPC ............ G01J 5/0875; G01J 2005/0077; G01J 2005/0081; H04N 5/2252
  USPC ...................................... 348/82, 83
  See application file for complete search history.

(56) References Cited

U.S. PATENT DOCUMENTS

| | | | | |
|---|---|---|---|---|
| 3,145,705 A * | 8/1964 | Bruce | ............... | F23M 11/042 110/179 |
| 3,609,236 A * | 9/1971 | Heilman | ............... | F27D 21/02 348/83 |
| 3,718,758 A * | 2/1973 | Ponghis | ............... | C21B 7/24 348/359 |
| 4,468,771 A * | 8/1984 | Zhukov | ............... | G01J 5/041 356/44 |
| 4,617,638 A * | 10/1986 | Krause | ............... | C10B 45/00 201/1 |
| 4,840,474 A * | 6/1989 | Heft | ............... | G02B 23/2492 348/83 |
| 4,969,035 A * | 11/1990 | Dawson | ............... | C21B 7/24 348/359 |
| 5,139,412 A * | 8/1992 | Kychakoff | ............... | F23N 5/082 110/186 |
| 5,162,906 A * | 11/1992 | Yorita | ............... | F27D 21/02 348/83 |
| 5,777,668 A * | 7/1998 | Amano | ............... | F23N 5/082 348/83 |
| 6,069,652 A * | 5/2000 | Eversole | ............... | H04N 5/2252 348/83 |
| 6,111,599 A * | 8/2000 | Nance | ............... | F27D 21/02 348/82 |
| 6,229,563 B1 * | 5/2001 | Miller, II | ............... | F27D 21/02 348/82 |
| 6,279,494 B1 | 8/2001 | Jimbo et al. | | |
| 6,325,621 B1 * | 12/2001 | Murasaki | ............... | C03B 5/24 348/83 |
| 7,184,076 B2 * | 2/2007 | Woodstock | ............... | H04N 5/2252 348/207.99 |
| 7,316,176 B2 * | 1/2008 | Dunn | ............... | G01D 5/28 348/82 |
| 8,896,661 B2 * | 11/2014 | Baleine | ............... | G02B 23/2492 348/36 |
| 2004/0212675 A1 * | 10/2004 | Lee | ............... | F27D 21/02 348/83 |
| 2006/0050147 A1 * | 3/2006 | Gao | ............... | C21B 7/24 348/83 |
| 2007/0044652 A1 * | 3/2007 | Dunn | ............... | G01D 5/28 92/5 R |
| 2007/0125962 A1 * | 6/2007 | Okabe | ............... | H01L 21/67109 250/492.1 |
| 2008/0158349 A1 * | 7/2008 | Miller | ............... | A61B 1/00052 348/82 |
| 2012/0113245 A1 * | 5/2012 | Blanchard | ............... | G21F 7/02 348/83 |
| 2012/0216568 A1 * | 8/2012 | Fisher, Jr. | ............... | C03B 5/235 65/29.21 |

FOREIGN PATENT DOCUMENTS

| | | |
|---|---|---|
| JP | 11-351556 A | 12/1999 |
| JP | 2003-083813 A | 3/2003 |
| KR | 10-2001-0013012 A | 2/2001 |
| KR | 10-0607052 B1 | 8/2006 |
| KR | 10-2012-0028759 A | 3/2012 |
| KR | 10-2012-0065668 A | 6/2012 |

* cited by examiner (a)

(b)

(c)

(a)

(b)

(c)

APPARATUS FOR MEASURING TEMPERATURE OF GLASS MELTING FURNACE

TECHNICAL FIELD

The present invention generally relates to a technology of treatment of radioactive wastes and, more particularly, to an apparatus for measuring the temperature of a glass melting furnace.

BACKGROUND ART

Vitrification is preferably used in the treatment of radioactive wastes. Vitrification of radioactive wastes is a process in which the nuclear species of radioactive wastes are bonded into a glass matrix, so that the vitrification can realize stabilized treatment of the radioactive wastes.

To vitrify radioactive wastes, the radioactive wastes are put into a glass melting furnace together with fragmented glass so that the radioactive wastes are melted with the glass, thus forming glass melt in the furnace. When solidifying the glass melt, solidified glass that captures the nuclear species of radioactive wastes therein is produced.

A conventional temperature measuring apparatus used to measure the temperature of the glass melting furnace is a thermocouple as disclosed in Korean Patent Application Publication No. 10-2010-0126922. Here, the thermocouple performs the measurement of temperature while being in direct contact with an object to be measured, so that a protective pipe surrounding the thermocouple is exposed to high temperature glass melt and is subjected to chemical corrosion. The chemical corrosion of the protective pipe reduces the life span of the protective pipe, and it is required to frequently change the protective pipe with a new one.

RELATED ART DOCUMENT

Patent Document (Patent Document 1) Korean Patent Application Publication No. 10-2010-0126922

DISCLOSURE

Technical Problem

Accordingly, the present invention has been made keeping in mind the above problems occurring in the related art, and the present invention is intended to propose an apparatus for measuring the temperature of a glass melting furnace, which is having a thermographic camera and can indirectly measure the temperature of melted glass contained in the glass melting furnace.

The present invention is also intended to propose an apparatus for measuring the temperature of a glass melting furnace, which is provided with a thermographic camera and a unit for cooling the thermographic camera, thereby precisely and efficiently measuring the temperature of glass melt contained in the glass melting furnace.

Technical Solution

In order to achieve the above object, according to one aspect of the present invention, there is provided an apparatus for measuring a temperature of a glass melting furnace, the apparatus including: a barrel-shaped glass window part having a transparent glass window, mounted to a temperature measurement hole of the glass melting furnace, and extended outside of the glass melting furnace, so as to form a through hole that communicates with the temperature measurement hole; and a camera part having a thermographic camera to capture image of inside of the glass melting furnace through the glass window part, wherein the glass window is positioned in the through hole far from the glass melting furnace.

The glass window part may comprise multiple layers that are separated from and combined with each other.

The multiple layers of the glass window part may be provided with at least one cooling gas flow path through which cooling gas supplied from the outside of the glass melting furnace is guided to the through hole.

The at least one cooling gas flow path may introduce the cooling gas to the through hole through a sidewall of the barrel-shaped glass window part, and may include: a first flow path by which the cooling gas is directed to the glass window; and a second flow path by which the cooling gas is directed to the temperature measurement hole.

The glass window part may include: a flange plate mounted to the temperature measurement hole; a body plate arranged on the flange plate; a body plate cover arranged on the body plate; a glass flange arranged on the body plate cover; a glass holder arranged on the glass flange; and a glass window unit detachably mounted in the glass holder.

The glass window unit may be a slidable unit provided with a plurality of glass windows, and the glass holder may slidably hold the slidable glass window unit.

The apparatus may further include a support combined with the body plate, wherein the camera part is combined with the support in such a way that a rear end of the glass window part is not in contact with a front end of the camera part.

The camera part may include: a casing combined with a support; and a thermographic camera provided in the casing.

The casing may be provided with a wall, a part or an entirety of which may be a double wall having a space therein, with a cooling gas inlet and a cooling gas outlet provided in the wall so as to allow circulation of the cooling gas.

Advantageous Effects

The present invention is advantageous in that it is possible to indirectly measure the temperature of melted glass contained in the glass melting furnace by using a thermographic camera, and thus the life span of a measurement apparatus can be increased. Furthermore, the present invention provided with the thermographic camera is not covered with fumes on a surface of a glass window, so the number of times required to stop the operation of the present invention to change or repair the glass window is decreased.

DESCRIPTION OF DRAWINGS

FIGS. 4(a) to 4(c) are views illustrating a glass flange provided in the apparatus for measuring the temperature of the glass melting furnace according to the present invention, in which FIG. 4(a) is a perspective view, FIG. 4(b) is a top plan view, and FIG. 4(c) is a sectional view;

FIGS. 5(a) and 5(b) are views illustrating a first guide ring provided in the apparatus for measuring the temperature of the glass melting furnace according to the present invention, in which FIG. 5(a) is a perspective view, and FIG. 5(b) is a sectional view;

FIGS. 6(a) to 6(c) are views illustrating a body plate cover provided in the apparatus for measuring the temperature of the glass melting furnace according to the present invention, in which FIG. 6(a) is a perspective view, FIG. 6(b) is a top plan view, and FIG. 6(c) is a sectional view;

FIGS. 7(a) and 7(b) are views illustrating a second guide ring provided in the apparatus for measuring the temperature of the glass melting furnace according to the present invention, in which FIG. 7(a) is a perspective view, and FIG. 7(b) is a sectional view;

Figure 1:
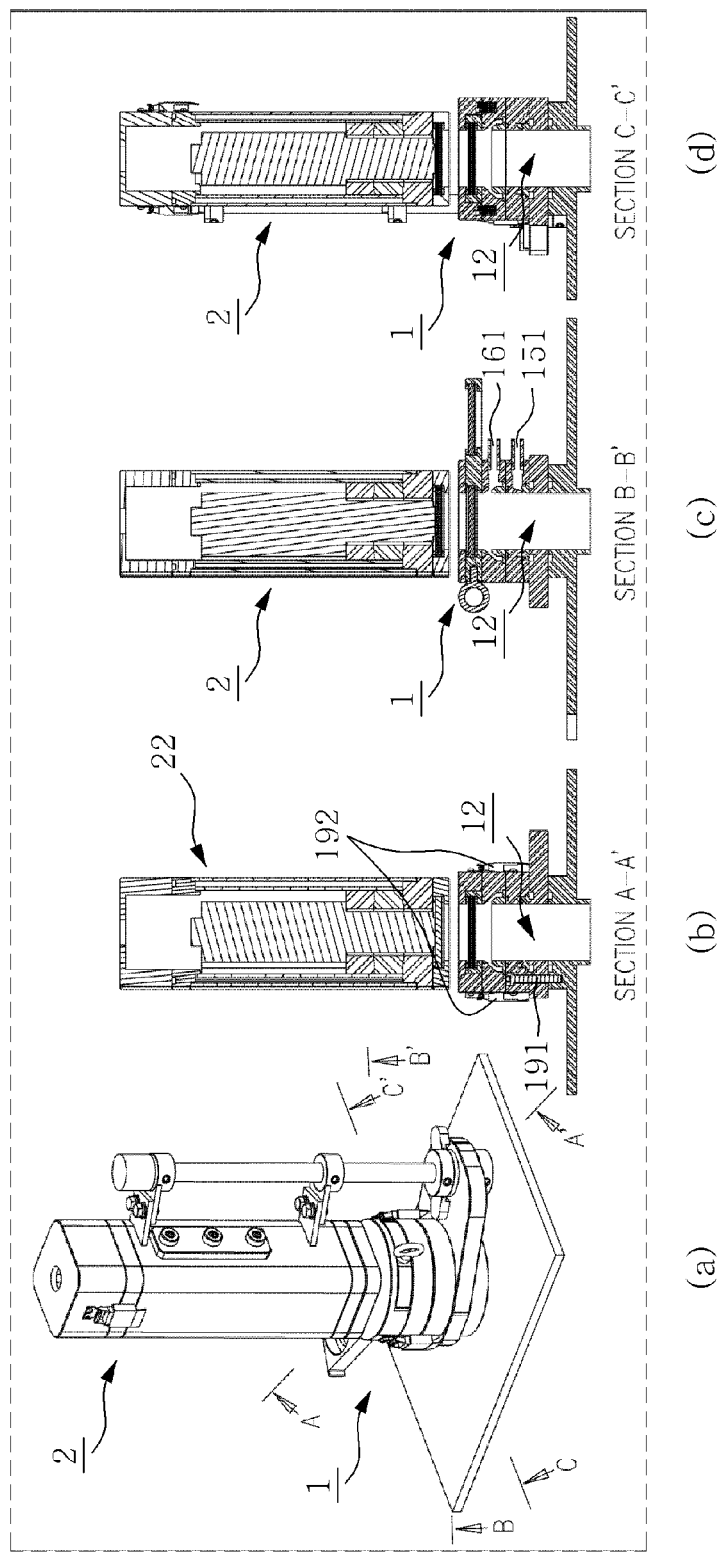
FIGS. 1(*a*) to 1(*d*) are views illustrating an apparatus for measuring the temperature of a glass melting furnace according to the present invention, in which FIG. 1(*a*) is a perspective view, FIG. 1(*b*) is a sectional view taken along line A-A' of FIG. 1(*a*), FIG. 1(*c*) is a sectional view taken along line B-B' of FIG. 1(*a*), and FIG. 1(*d*) is a sectional view taken along line C-C' of FIG. 1(*a*)

<Description of the Reference Numerals in the Drawings>

| | |
|---|---|
| 1: Glass window part | 2: Camera part |
| 3: Support | 11: Glass window |
| 12: Through hole | 13: Flange plate |
| 14: Body plate | 15: Body plate cover |
| 16: Glass flange | 17: Glass holder |
| 18: Glass window unit | 21: Thermographic camera |
| 22: Casing | 41: First guide ring |
| 42: Second guide ring | 51: First flow path |
| 52: Second flow path | 161: First gas inlet |
| 151: Second gas inlet | 171: Guide step |
| 221: First cover | 222: Second cover |
| 223: Third cover | |

BEST MODE

An exemplary embodiment of the present invention will now be made in detail with reference to the accompanying drawings.

Figure 2:
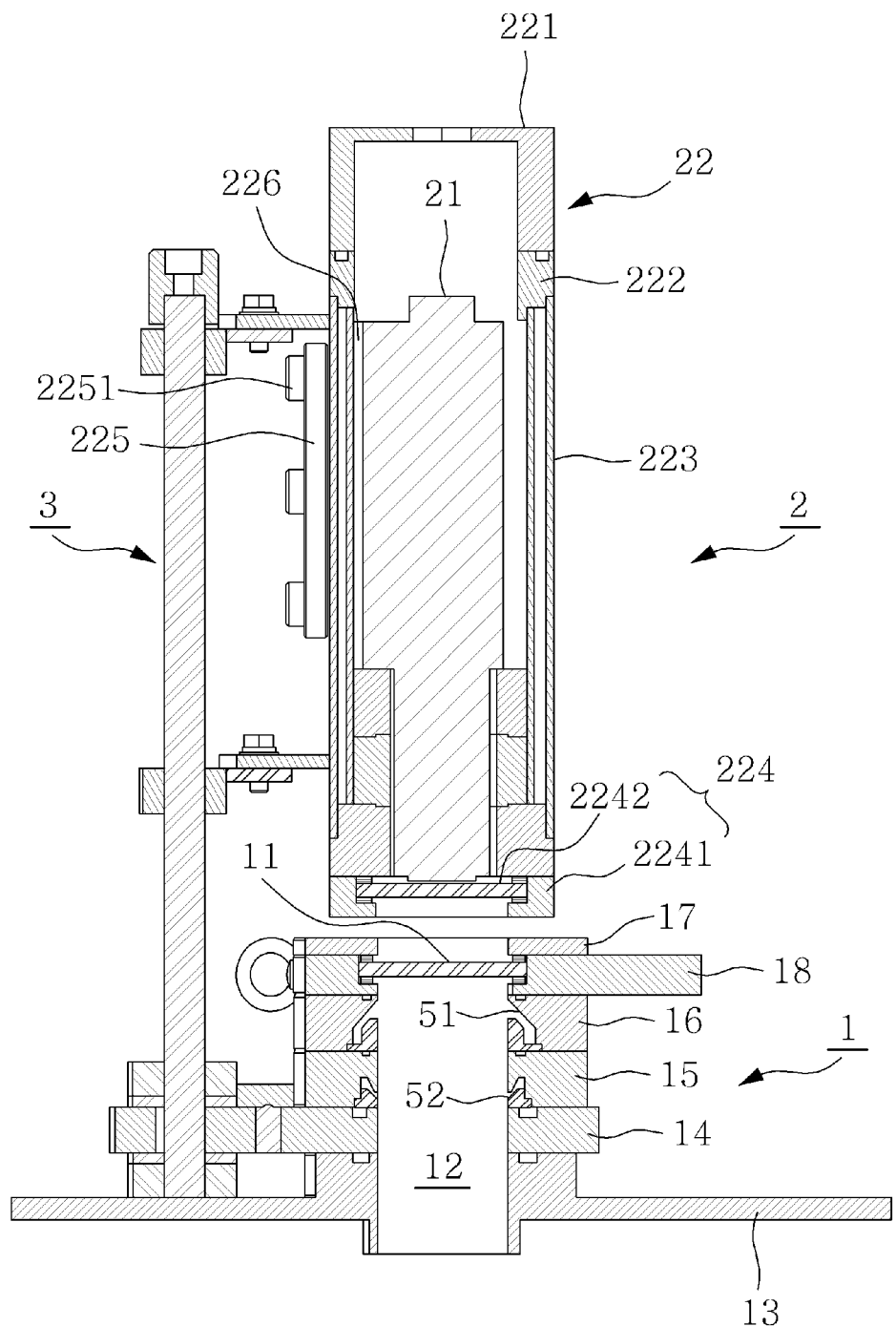
FIG. 2 is a sectional view illustrating the apparatus for measuring the temperature of the glass melting furnace according to the present invention.
Figure 3:
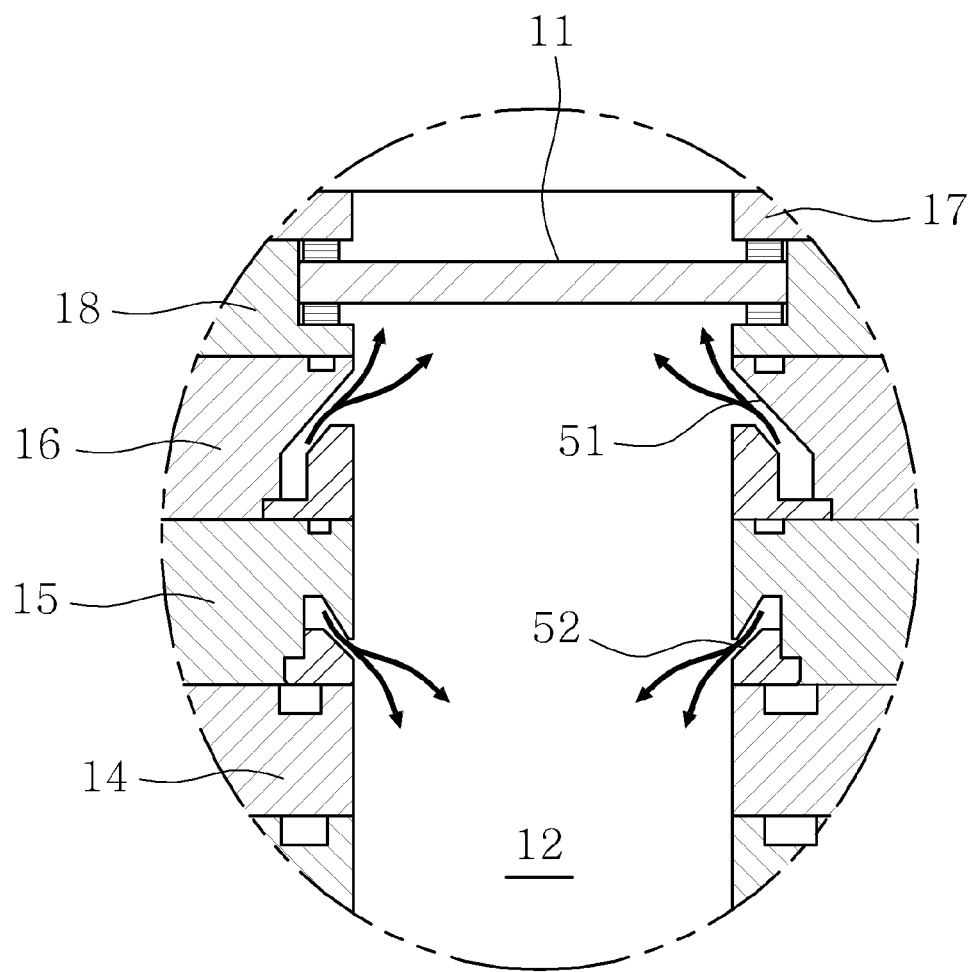
FIG. 3 is an enlarged view of a through hole in the apparatus for measuring the temperature of the glass melting furnace of FIG. 2.

FIGS. 1(a) to 1(d) are views illustrating an apparatus for measuring the temperature of a glass melting furnace according to the present invention, in which FIG. 1(a) is a perspective view, FIG. 1(b) is a sectional view taken along line A-A' of FIG. 1(a), FIG. 1(c) is a sectional view taken along line B-B' of FIG. 1(a), and FIG. 1(d) is a sectional view taken along line C-C' of FIG. 1(a). FIG. 2 is a sectional view illustrating the apparatus for measuring the temperature of the glass melting furnace according to the present invention. FIG. 3 is an enlarged view of a through hole in the apparatus for measuring the temperature of the glass melting furnace of FIG. 2.

Referring to the drawings, the apparatus for measuring the temperature of the glass melting furnace according to the present invention includes a glass window part 1 and a camera part 2.

The glass window part 1 having a transparent glass window 11 is mounted to a temperature measurement hole of the glass melting furnace. Since the glass window part 1 is barrel-shaped, it is provided with the through hole 12 so that the glass window part 1 may communicate with the temperature measurement hole of the glass melting furnace. As described in detail above, the glass window 11 is arranged to cover the through hole 12. Since the glass window part 1 is barrel-shaped, the through hole 12 extends to the outside of the temperature measurement hole. The glass window 11 is preferably positioned in the through hole far from the glass melting furnace.

The camera part 2 includes a casing 22 and a thermographic camera 21 provided in the casing 22. The thermographic camera 21 measures the temperature of the inside of the glass melting furnace or the temperature of the melted glass through the glass window 11 and the through hole 12 of the glass window part 1.

The glass window part 1 and the camera part 2 are combined with the support 3 respectively, so that a rear end of the glass window part 1 is not in contact with the front end of the camera part 2. Accordingly, the heat of the glass melting furnace is not directly carried to the camera part 2.

More specifically, the glass window part 1 is multi-layered, so that the layers can be separated from or combined with each other. The multi-layered structure is provided with at least one cooling gas flow path through which the cooling gas is introduced from the outside.

The multi-layers of the glass window part 1 include: a flange plate 13 mounted to the temperature measurement hole; a body plate 14 arranged on the flange plate 13; the body plate cover 15 arranged on the body plate 14; a glass flange 16 arranged on the body plate cover 15; a glass holder 17 arranged on the glass flange 16; and a glass window unit 18 detachably mounted in the glass holder 17. As described hereinafter, the glass window unit 18 is slidable and may include a plurality of glass windows 11, and is detachably mounted in the glass holder 17.

The multi-layers each are combined by using a first locking member 191 such as a bolt or a screw and a second locking member 192 mounted to the outside of the glass window part 1.

Particularly, the multi-layers are advantageous in that they can flexibly realize a cooling gas flow path. In an embodiment illustrated, at least two cooling gas flow paths may be formed.

A first flow path 51 introduces the cooling gas into the through hole through a sidewall of the glass window part 1, and guides the cooling gas to the glass window 11.

Figure 4:
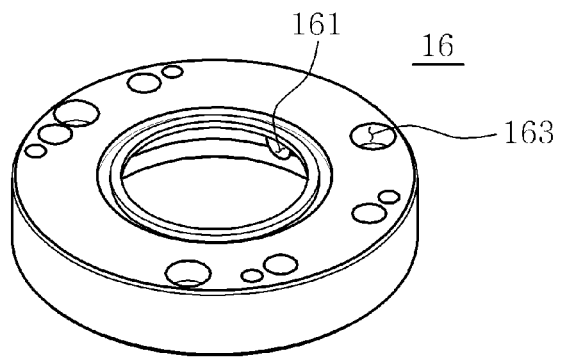
Figure 4:
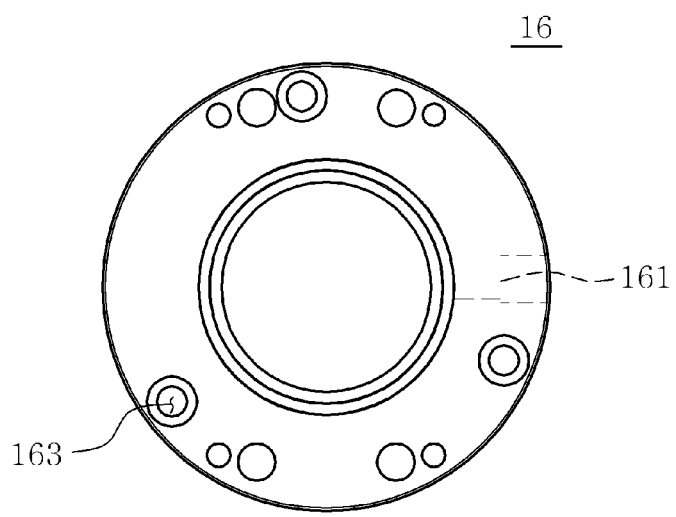
Figure 4:
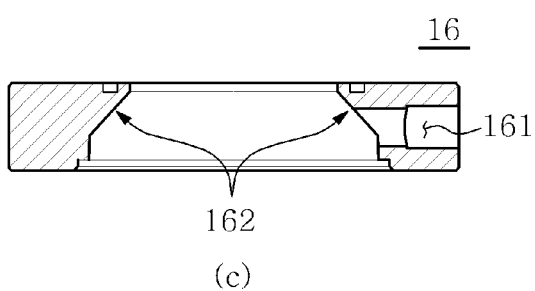

To realize this, the glass window part 1 of the apparatus for measuring the temperature of the glass melting furnace according to the present invention is provided with the first flow path 51 by using the glass flange 16 and a first guide ring 41. FIGS. 4(a) to 4(c) are views illustrating the glass flange 16, and FIGS. 5(a) and 5(b) are views illustrating the first guide ring 41.

Referring to FIGS. 4(a) to 4(c), the glass flange 16 is doughnut-shaped so as to be a part of the through hole 12. An inner sidewall of the glass flange 16 also has an inclined surface 162 that tapers toward the top of the inner sidewall such that the inner diameter of the flange 16 decreases toward the top of the inner sidewall, thus forming the first flow path 51. That is, the inner diameter of the flange 16 increases toward the bottom of the inner sidewall of the glass flange. The glass flange 16 is also provided with a first gas inlet 161, which is provided passing through an inside wall surface and an outside wall surface. Through the first gas inlet 161, the cooling gas may be supplied to the through hole 12. Holes provided on the glass flange 16 are locking holes 163 engaged with locking members, and may be provided at least one.

Figure 5:
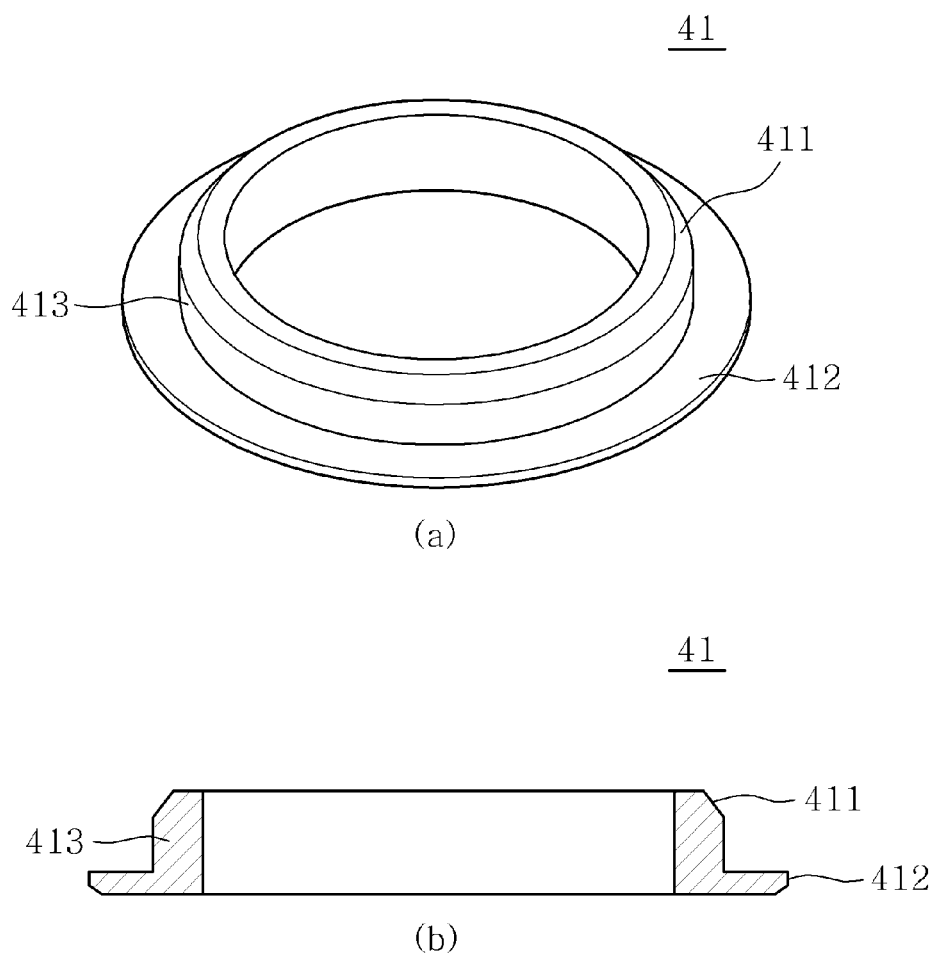

Referring to FIGS. 5(a) and 5(b), the first guide ring 41 is also doughnut-shaped and is seated on the body plate cover 15, forming the upwardly directed first flow path 51 together with the inclined surface 162. The first guide ring 41 has a sidewall 413 of a predetermined height so that the cooling gas introduced through the first gas inlet 161 may not be horizontally directed. The first guide ring 41 may also have a chamfered corner 411 cut at a predetermined angle on an outside edge of an upper end of the sidewall 413. The lower ends of the first guide ring 41 may also be extended to the outside in the form of a flange so as to be stably seated on the body plate cover 15.

Figure 6:
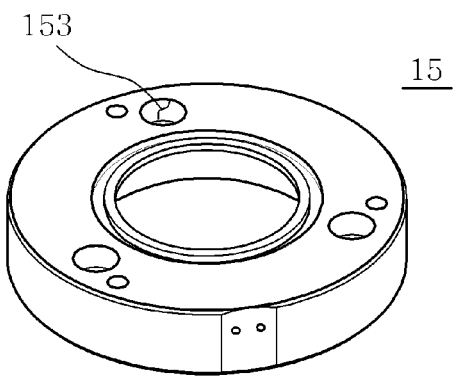
Figure 6:
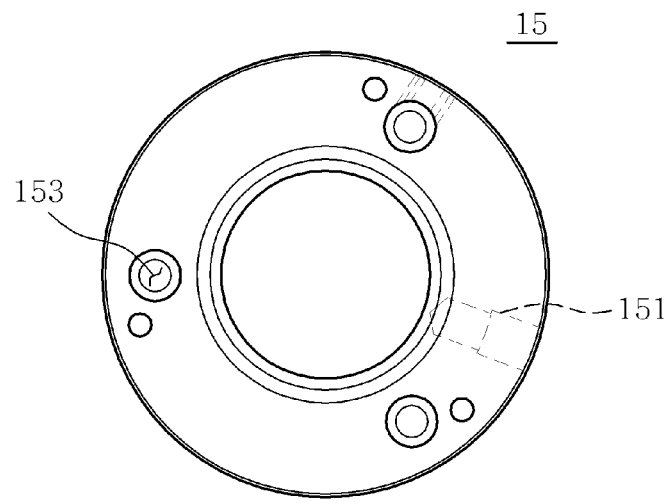
Figure 7:
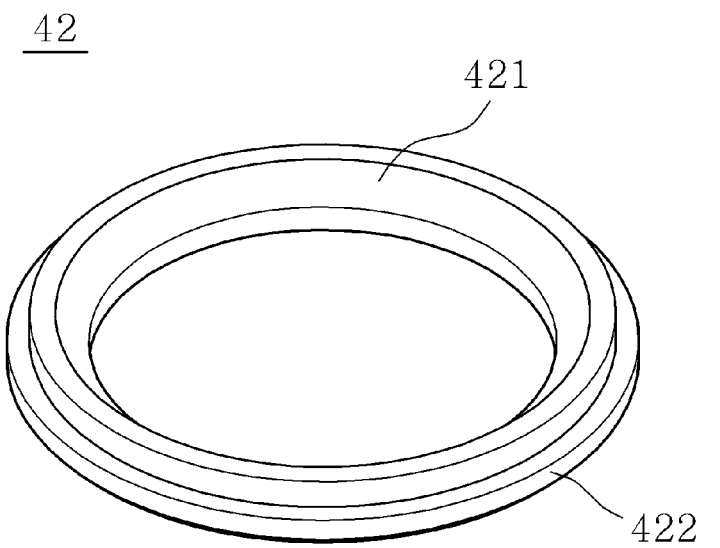
Figure 7:

As understood in FIG. 3, the first flow path 51 provided by the glass flange 16 and the first guide ring 41 supplies the cooling gas upwards throughout the inner surface of the through hole 12. Accordingly, the surface of the glass window 11 exposed to the through hole 12 can be prevented from being covered with fumes. FIGS. 6(a) to 6(c) are views illustrating the body plate cover provided in the apparatus for measuring the temperature of the glass melting furnace according to the present invention, in which FIG. 6(a) is a perspective view, FIG. 6(b) is a top plan view, and FIG. 6(c) is a sectional view. FIGS. 7(a) and 7(b) are views illustrating a second guide ring provided in the apparatus for measuring the temperature of the glass melting furnace according to the present invention, in which FIG. 7(a) is a perspective view, and FIG. 7(b) is a sectional view.

A second flow path 52 may be provided by the body plate cover 15 and the second guide ring 42. The body plate cover 15 is doughnut-shaped so as to be a part of the through hole 12, and is provided with a second gas inlet 151 that is provided by passing from an outer wall surface to an inner wall surface. The body plate cover 15 also has a protrusion 152 that tapers downward so that the cooling gas introduced through the second gas inlet 151 may not be horizontally directed. Holes provided on the body plate cover 15 are locking holes 153.

The second guide ring 42 has an inclined surface 421 on an inner surface whose diameter is tapered downward. Accordingly, the second flow path 52 directed downward is provided by a protrusion 422 and the inclined surface 421. The second guide ring 42 may be provided with a flanged-shaped protrusion 422 at an outer surface of the bottom thereof. As illustrated in the drawings, the second guide ring 42 is arranged on the body plate 14.

The second flow path 52 is directed to the temperature measurement hole, so that it can prevent fumes or heat in the glass melting furnace from being guided to the glass window 11.

Figure 8:
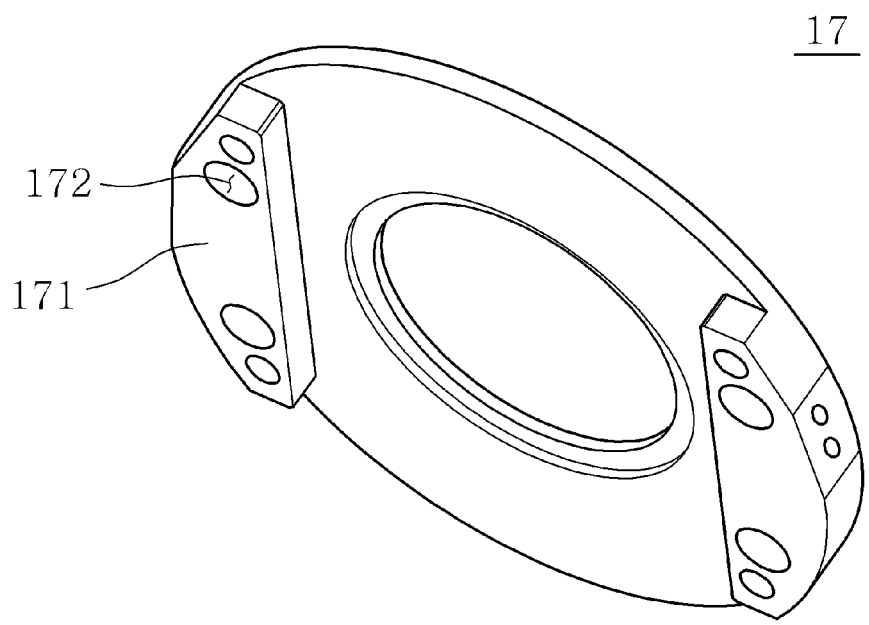
FIG. 8 is a view illustrating a glass holder provided in the apparatus for measuring the temperature of the glass melting furnace according to the present invention.
Figure 9:
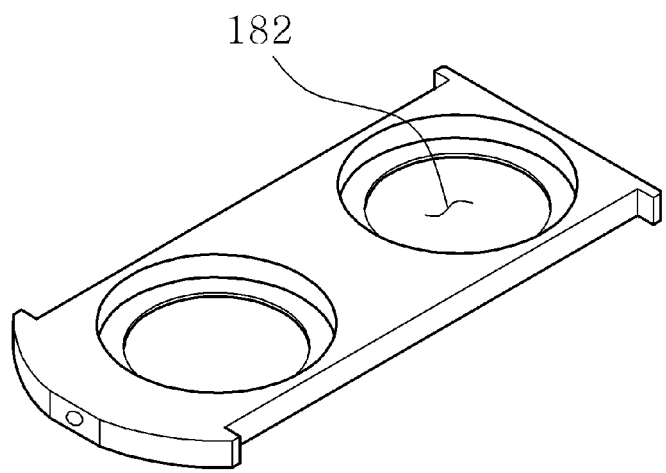
FIG. 9 is a view illustrating a glass window unit provided in the apparatus for measuring the temperature of the glass melting furnace according to the present invention.

FIGS. 8 and 9 illustrate the glass holder 17 and the glass window unit 18 respectively provided in the glass window part 1 of the apparatus for measuring the temperature of the glass melting furnace according to the present invention.

As illustrated in FIGS. 7(a) and 7(b), the glass holder 17 arranged on an upper end of the glass window part 1 is doughnut-shaped so as to form a part of the through hole 12. The glass holder 17 also has guide steps 171 at opposite sides of the bottom surface of the glass holder 17. With the guide steps 171 facing downward, the glass holder 17 is combined with the glass flange 16 by using locking holes 172. The glass window unit 18 is slidably inserted between the guide steps 171.

The glass window unit 18 has at least one glass hole 182 individually provided with a glass window 11, and is slidably inserted in the glass holder 17. Accordingly, the individual glass window 11 provided in the glass window unit 18 may be selectively used. For example, the glass window 11 in use may be slidably moved so that the glass window 11 can be cleaned or replaced with another glass window 11.

As illustrated above, the camera part 2 includes: the casing 22; and the thermographic camera 21 provided in the casing 22. The camera part 2 is provided with the thermographic camera 21 arranged to photograph the inside of the glass melting furnace via the through hole 12 of the glass window part 1. As illustrated above, the glass window part 1 and the camera part 2 are combined with the support 3 respectively, so that the rear end of the glass window part 1 is not in contact with the front end of the camera part 2. As for the thermographic camera 21, the infrared light relative to a thermographic ranges from 3 to 25 µm. Though the thermographic camera 21 seems to operate similar to a video camera, it produces an image by detecting infrared energy rather than visible light.

The casing 22 of the camera part 2 is composed of multiple parts. For example, the casing 22 may include a first cover 221, a second cover 222, and a third cover 223. Particularly, the third cover 223 positioned at a side of the thermographic camera 21 may have a double wall structure having a space between inner and outer walls of the structure.

The casing glass part 224 is arranged at a front end of the casing 22, and includes a glass bracket 2241 and a casing glass 2242 provided in the glass bracket 2241.

The thermographic camera 21 is supported in the casing 22 by the camera support bracket 225 arranged outside of the casing 22 and by the camera support 226 arranged inside of the casing 22. The reference numeral 2251 denotes a locking member.

The third cover 223 of the casing 22 is provided with a cooling gas inlet and a cooling gas outlet, so that a cooling nitrogen gas can be supplied to and circulated in the space in the double wall.

What is claimed is:
1. An apparatus for measuring a temperature of a glass melting furnace, the apparatus comprising:
 a glass window part including
  a flange plate mounted to a temperature measurement hole of the glass melting furnace and extended outward from the glass melting furnace,
  a glass holder disposed over the flange plate and having guide steps, the guide steps being disposed on a surface of the glass holder and protruding from opposite sides of the surface of the glass holder,
  a glass window unit separated from the glass holder and mounted on the glass holder in a sliding manner such that the glass window unit is able to be slidingly inserted into and drawn out of a space between the guide steps even while the glass melting furnace is in use, and
  a glass window mounted on the glass window unit,
  wherein each of the flange plate, the glass holder and the glass window unit has a through hole in a center portion thereof such that the through hole communicates with the temperature measurement hole, and the glass window is disposed outside the glass melting furnace;
 a camera part including a thermographic camera configured to capture image of an inside of the glass melting furnace through the through hole of the glass window part; and a support disposed in an outside of and separately from the glass window part and the camera part, wherein an end of the support is place on an outer surface of the flange plate, and the glass window part and the camera part are supported by the support such that the camera part is disposed above and not in contact with the glass window part.

2. The apparatus for measuring the temperature of the glass melting furnace according to claim 1, wherein the glass window part comprises multiple layers that can be separated from and combined with each other.

3. The apparatus for measuring the temperature of the glass melting furnace according to claim 1, wherein the glass window part is provided with at least one cooling gas flow path through which cooling gas is supplied from the outside of the glass window part.

4. The apparatus for measuring the temperature of the glass melting furnace according to claim 1, wherein the glass window part further includes
  a body plate disposed on the flange plate and coupled to the support to support the glass window part,
  a body plate cover separated from the body plate, disposed on the body plate and forming a first cooling gas flow path for supplying cooling gas toward the temperature measurement hole, the cooling gas being supplied from the outside of the glass window part, and
  a glass flange separated from the body plate cover, disposed on the body plate cover and forming a second cooling gas flow path for supplying the cooling gas toward the glass window, wherein the second cooling gas flow path is separated from the first cooling gas flow path.

5. The apparatus for measuring the temperature of the glass melting furnace according to claim 1, wherein the glass window unit has a plate-shape and is provided with a plurality of glass windows arranged side by side on a same plane.

6. The apparatus for measuring the temperature of the glass melting furnace according to claim 1, wherein the camera part further includes:
  a casing provided with the thermographic camera and coupled to the support.

7. The apparatus for measuring the temperature of the glass melting furnace according to claim 6, wherein the casing includes a double wall having a space therein to allow circulation of the cooling gas.

8. An apparatus for measuring a temperature of a glass melting furnace, the apparatus comprising:
  a glass window part including
    a flange plate mounted to a temperature measurement hole of the glass melting furnace and extended outward from the glass melting furnace,
    a body plate disposed over the flange plate,
    a glass holder disposed over the flange plate and having guide steps, the guide steps being disposed on a surface of the glass holder and protruding from opposite sides of the surface of the glass holder,
    a glass window unit separated from the glass holder and mounted on the glass holder in a sliding manner such that the glass window unit is able to be slidingly inserted into and drawn out of a space between the guide steps even while the glass melting furnace is in use, and
    a glass window mounted on the glass window unit,
    wherein each of the flange plate, the body plate, the glass holder and the glass window unit has a through hole in a center portion thereof such that the through hole communicates with the temperature measurement hole, and the glass window is disposed outside the glass melting furnace and covers the through hole of the glass window unit;
  a camera part including
    a casing, and
    a thermographic camera disposed inside the casing and configured to capture image of an inside of the glass melting furnace through the through hole of the glass window part; and
  a support disposed in an outside of and separately from the glass window part and the camera part,
  wherein an end of the support is place on an outer surface of the flange plate, and the body plate of the glass window part is coupled to the support for supporting the glass window part, and the casing of the camera part is coupled to the support for supporting the camera part such that the camera part is disposed above and not in contact with the glass window part.

9. The apparatus for measuring the temperature of the glass melting furnace according to claim 8, wherein the glass window part further includes
  a body plate cover separated from the body plate, disposed on the body plate and forming a first cooling gas flow path for supplying cooling gas toward the temperature measurement hole, the cooling gas being supplied from the outside of the glass window part, and
  a glass flange separated from the body plate cover, disposed on the body plate cover and forming a second cooling gas flow path for supplying the cooling gas toward the glass window, wherein the second cooling gas flow path is separated from the first cooling gas flow path.

10. The apparatus for measuring the temperature of the glass melting furnace according to claim 9, wherein the through hole of the glass flange is formed such that a diameter of an upper part thereof is greater than that of a lower part thereof, and
  the through hole of the body plate cover is formed such that a diameter of a lower part thereof is greater than that of an upper part thereof.

11. The apparatus for measuring the temperature of the glass melting furnace according to claim 9, wherein the glass window part further includes
  a first guide ring disposed between the body plate cover and the body plate and configured to guide the cooling gas toward the temperature measurement hole, and
  a second guide ring disposed between the glass flange and the body plate cover and configured to guide the cooling gas toward the glass window.

12. The apparatus for measuring the temperature of the glass melting furnace according to claim 8, wherein the glass window unit has a plate-shape and includes a plurality of glass windows arranged side by side on a same plane.

13. The apparatus for measuring the temperature of the glass melting furnace according to claim 9, wherein each of the body plate, the body plate cover, the glass flange and a glass holder has locking holes on the periphery of the through hole to fix each other.

14. The apparatus for measuring the temperature of the glass melting furnace according to claim 8, wherein the casing includes a double wall having a space therein through which cooling gas flows.

* * * * *